(12) United States Patent
Kuo et al.

(10) Patent No.: US 12,373,928 B2
(45) Date of Patent: Jul. 29, 2025

(54) IMAGE CORRECTION METHOD AND COMPUTING DEVICE UTILIZING METHOD

(71) Applicant: HON HAI PRECISION INDUSTRY CO., LTD., New Taipei (TW)

(72) Inventors: Chin-Pin Kuo, New Taipei (TW); Tung-Tso Tsai, New Taipei (TW); Guo-Chin Sun, New Taipei (TW); Tzu-Chen Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 678 days.

(21) Appl. No.: 17/561,829

(22) Filed: Dec. 24, 2021

(65) Prior Publication Data

US 2022/0207669 A1 Jun. 30, 2022

(30) Foreign Application Priority Data

Dec. 28, 2020 (CN) .......................... 202011585212.2

(51) Int. Cl.
*G06T 5/80* (2024.01)
*G06T 3/4038* (2024.01)
*G06T 5/10* (2006.01)

(52) U.S. Cl.
CPC .............. *G06T 5/80* (2024.01); *G06T 3/4038* (2013.01); *G06T 5/10* (2013.01)

(58) Field of Classification Search
CPC ........... G06T 5/80; G06T 3/4038; G06T 5/10; G06T 2207/20021; G06T 7/70
See application file for complete search history.

(56) References Cited

U.S. PATENT DOCUMENTS

| | | | | |
|---|---|---|---|---|
| 7,027,665 B1* | 4/2006 | Kagle | ............... | H04N 1/32358 |
| | | | | 382/284 |
| 10,136,063 B2* | 11/2018 | Ryu | .......................... | G06T 5/70 |
| 10,387,752 B1* | 8/2019 | Kim | ..................... | G06V 10/774 |
| 11,158,026 B1* | 10/2021 | Kamal | ................. | H04N 13/239 |
| 2006/0153472 A1* | 7/2006 | Sakata | ................... | H04N 23/68 |
| | | | | 382/255 |
| 2008/0170124 A1* | 7/2008 | Hatanaka | ................. | G06T 5/50 |
| | | | | 348/208.4 |

(Continued)

FOREIGN PATENT DOCUMENTS

| | | |
|---|---|---|
| CN | 103426160 | 12/2013 |
| CN | 111539880 | 8/2020 |

(Continued)

*Primary Examiner* — Solomon G Bezuayehu
(74) *Attorney, Agent, or Firm* — ScienBiziP, P.C.

(57) ABSTRACT

In an image correction method, a distorted image and a standard image corresponding to the distorted image are obtained. The distorted image is divided into first image regions, the standard image into second image regions. For each first image region and corresponding second image region, first and second points respectively are selected. A relationship between the first image region and the second image region is determined according to differences between the first points and the second points. The first image region is corrected according to the relationship between the first image region and the second image region and corrected first image regions are stitched to obtain a corrected image of the distorted image. The image correction method improves the accuracy of image correction.

9 Claims, 3 Drawing Sheets

(56) References Cited

U.S. PATENT DOCUMENTS

| | | | |
|---|---|---|---|
| 2009/0067722 A1* | 3/2009 | Lin | G06T 7/001 |
| | | | 382/181 |
| 2009/0179995 A1* | 7/2009 | Fukumoto | H04N 23/6811 |
| | | | 348/208.6 |
| 2010/0123807 A1* | 5/2010 | Lee | G06T 5/50 |
| | | | 348/241 |
| 2013/0004079 A1* | 1/2013 | Yamada | G06V 10/462 |
| | | | 382/190 |
| 2013/0033487 A1* | 2/2013 | Han | H04N 13/133 |
| | | | 382/154 |
| 2015/0206029 A1* | 7/2015 | Chikano | G06V 10/757 |
| | | | 382/201 |
| 2016/0357493 A1* | 12/2016 | Zerwas | G09G 5/12 |
| 2017/0330311 A1* | 11/2017 | Suzuki | G06T 7/11 |
| 2018/0336665 A1* | 11/2018 | Miyauchi | H04N 1/62 |
| 2019/0089906 A1* | 3/2019 | Joo | H04N 23/683 |
| 2019/0306383 A1* | 10/2019 | Liu | H04N 23/81 |
| 2020/0311884 A1* | 10/2020 | Hong | G06T 5/77 |
| 2021/0082086 A1* | 3/2021 | Bichu | G06T 5/80 |
| 2021/0225006 A1* | 7/2021 | Grady | G06T 7/174 |
| 2022/0353532 A1* | 11/2022 | Zakharchenko | G06T 1/20 |

FOREIGN PATENT DOCUMENTS

| | | |
|---|---|---|
| TW | 201225005 | 6/2012 |
| TW | 202016879 | 5/2020 |

* cited by examiner

IMAGE CORRECTION METHOD AND COMPUTING DEVICE UTILIZING METHOD

FIELD

The subject matter herein generally relates to image processing, specifically an image correction method, an image correction system, a computing device, and a computer storage medium.

BACKGROUND

Image correction plays an important role in image processing scenarios such as image comparison and detection of defects revealed in images.

Generally, an image captured by a camera may be tilted or deformed, for reasons such as lens angle and light and the image needs correction.

DETAILED DESCRIPTION

The drawings are combined with the detailed description to illustrate the embodiments of the present disclosure hereinafter. It is noted that embodiments of the present disclosure and features of the embodiments can be combined, when there is no conflict.

Various details are described in the following descriptions for better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

The image correction method may be executed by one or more computing devices. The computing device may be a device that can automatically perform numerical calculation and/or information processing according to preset or stored instructions, and hardware of the computing device may include, but is not limited to, a microprocessor, an application specific integrated circuit (ASIC), a field-programmable gate array (FPGA), a digital signal processor (DSP), an embedded device, etc.

The computing device may be a desktop computer, a notebook, a palmtop computer, and a cloud server. The computing device can interact with a user through a keyboard, a mouse, a remote control, a touchpad, or a voice control device.

Embodiment 1

Figure 1:
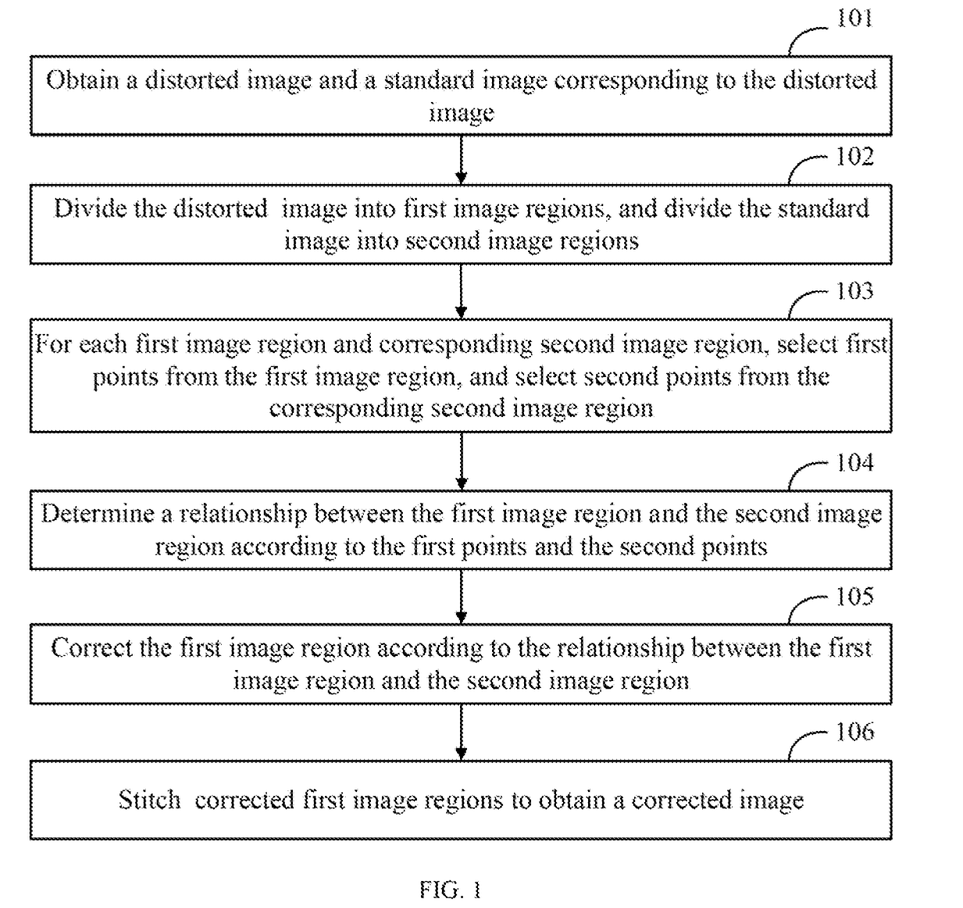
FIG. 1 is a flowchart of an image correction method provided in one embodiment of the present disclosure.

FIG. 1 is a flowchart of an image correction method in one embodiment. The method is applied to a computing device. The method is used for correcting images. According to different requirements, the order of the steps in the flowchart may be changed, and some steps may be omitted.

In block 101, the computing device obtains a distorted image and a standard image corresponding to the distorted image.

The distorted image is an image to be corrected. The standard image is an image without distortion or other fault. Same scene is depicted in the distorted image and in the standard image.

The distorted image can be captured by an image capturing device, or be obtained from an image database.

In block 102, the computing device divides the distorted image into a plurality of image regions (hereinafter referred to as "first image regions"), and divides the standard image into a plurality of image regions (hereinafter referred to as "second image regions"). A number of the first image regions is same as the second image regions, and each first image region corresponds to a second image region.

The computing device may use a single method to divide the distorted image and the standard image.

For example, the computing device may divide the distorted image into two first image regions along a vertical direction, and divide the standard image into two second image regions along the vertical direction.

In block 103, for each first image region and the corresponding second image region, the computing device selects a plurality of points (hereinafter referred to as "first points") from the first image region, and selects a plurality of points (hereinafter referred to as "second points") from the corresponding second image region.

For example, the first image region shows a picture of a table, and the computing device selects four corners of the table in the first image region as the first points. The second image region also includes the table, the computing device selects four corners of the table in the second image region as the second points.

In block 104, the computing device determines a relationship between the first image region and the second image region according to the first points and the second points.

In one embodiment, a method of determining a relationship between the first image region and the second image region according to the first points and the second points may include: calculating a transformation matrix from the first image region to the second image region according to the first points and the second points; and/or calculating a ratio between the first image region and the second image region according to the first points and the second points.

In one embodiment, the first points and the second points are denoted as two-dimensional coordinates, and a method of calculating a transformation matrix from the first image region to the second image region according to the first points and the second points may include: determining three-dimensional coordinates of the first points according to two-dimensional coordinates of the first points and the transformation matrix; constructing equation sets according to the three-dimensional coordinates of the first points and two-dimensional coordinates of the second points; and calculating the transformation matrix according to the equation sets.

For example, two-dimensional coordinates of a first point are $(x_1, y_1)$, two-dimensional coordinates of a second point corresponding to the first coordinate point are $(x_2, y_2)$, a transformation matrix from the first image region to the second image region is $$\begin{bmatrix} a_{11} & a_{12} & a_{13} \\ a_{21} & a_{22} & a_{23} \\ a_{31} & a_{32} & a_{33} \end{bmatrix},$$

and $a_{11}$ to $a_{33}$ are transformation parameters of the transformation matrix.

Three-dimensional coordinates of the first point can be:

$$\begin{bmatrix} x \\ y \\ z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} x_1 \\ y_1 \\ 1 \end{bmatrix}.$$

$(x,y,z)$ are the three-dimensional coordinates of the first point corresponding to the two-dimensional coordinates $(x_1,y_1)$ of the first point, where $x=a_{11}x_1+a_{12}y_1+a_{13}$, $y=a_{21}x_1+a_{22}y_1+a_{23}$, and $z=a_{31}x_1+a_{32}y_1+a_{33}$.

An equation set can be constructed according to the three-dimensional coordinates $(x,y,z)$ of the first point and the two-dimensional coordinates $(x_2,y_2)$ of the second point:

$$\begin{cases} x_2 = \dfrac{x}{z} = \dfrac{a_{11}+x_1+a_{12}y_1+a_{13}}{a_{31}+x_1+a_{32}y_1+a_{33}} \\ y_2 = \dfrac{y}{z} = \dfrac{a_{21}+x_1+a_{22}y_1+a_{23}}{a_{31}+x_1+a_{32}y_1+a_{33}} \end{cases}.$$

For each first point and corresponding second point, an equation set is constructed. For example, four first points are selected from the first image region, and four corresponding second points are selected from a corresponding second image region. Accordingly, four equation sets are constructed for the four first points and the four corresponding second points.

The transformation parameters $a_{11}$ to $a_{33}$ are calculated according to the equation sets.

In one embodiment, a method of calculating a ratio between the first image region and the second image region according to the first points and the second points may include: determining an x-axis and a y-axis of the first image region; determining first boundary points of the first image region according to the first points, and determining second boundary points of the second image region according to the second points; calculating a first distance between each of the first boundary points and the x-axis and a second distance between each of the first boundary points and the y-axis; calculating a third distance between each of the second boundary points and the x-axis and a fourth distance between each of the second boundary points and the y-axis; calculating a first ratio of the first distance to the third distance; and calculating a second ratio of the second distance to the fourth distance.

In block 105, the computing device corrects the first image region according to the relationship between the first image region and the second image region.

In one embodiment, a method of correcting the first image region according to the relationship between the first image region and the second image region may include: calculating new two-dimensional coordinates of each point in the first image region according to the transformation matrix, and correcting a pixel value of each point in the first image region according to the new two-dimensional coordinates of each point in the first image; or calculating a new x-coordinate and a new y-coordinate of each point in the first image region according to the ratio, and correcting a pixel value of each point in the first image region according to the new x-coordinate and the new y-coordinate of each point in the first image region.

In one embodiment, a method of calculating new two-dimensional coordinates of each point in the first image region according to the transformation matrix may include: converting original two-dimensional coordinates of each point in the first image region into three-dimensional coordinates according to the transformation matrix; and reducing a dimensionality of the three-dimensional coordinates to obtain the new two-dimensional coordinates.

In one embodiment, a method of calculating a new y-coordinate of each point in the first image region according to the ratio relationship may include: determining a first boundary point corresponding to each point in the first image region; determining a target ratio of the first boundary point according to the ratio relationship; acquiring a fifth distance between each point in the first image region and the x-axis of the first image region, and acquiring a sixth distance between the first boundary point and the x-axis. If the fifth distance is less than or equal to the sixth distance, calculating a product of a reciprocal of the target ratio and a y-coordinate of each point in the first image region to obtain the y target coordinate of each point in the first image region; if the fifth distance is greater than the sixth distance, obtaining a y-coordinate of a second boundary point corresponding to each point in the first image region, a y-coordinate of the first boundary point corresponding to each point in the first image region, y-coordinates of the first boundary points of the first image region, and y-coordinates of the second boundary points of the second image region, and calculating the new y-coordinate according to the y-coordinate of a second boundary point corresponding to each point in the first image region, the y-coordinate of the first boundary point corresponding to each point in the first image region, the y-coordinates of the first boundary points of the first image region, and the y-coordinates of the second boundary points of the second image region.

In one embodiment, a formula of calculating the new y-coordinate according to the y-coordinate of a second boundary point corresponding to each point in the first image region, the y-coordinate of the first boundary point corresponding to each point in the first image region, the y-coordinates of the first boundary points of the first image region, and the y-coordinates of the second boundary points of the second image region is:

$$\frac{O_y - E_y}{P_y - F_y} = \frac{W_y - E_y}{V_y - F_y}.$$

In the formula, $O_y$ represents the new y-coordinate of each point in the first image region, $E_y$ represents the y-coordinate of the second boundary point corresponding to each point in the first image region, $P_y$ represents the y-coordinate of each point in the first image region, and $F_y$ represents the y-coordinate of the first boundary point corresponding to each point in the first image region. $V_y$ represents the y-coordinates of the first boundary points of the first image region, and $W_y$ represents the y-coordinates of the second boundary points of the second image region.

In another embodiment, if the fifth distance is less than or equal to the sixth distance, the image correction method further may include: calculating a square of the reciprocal of the target ratio, and calculating a product of the square and the y-coordinate of the pixel point to obtain the y target coordinate of each point in the first image region.

In block 106, the computing device stitches corrected first image regions to obtain a corrected image of the distorted image.

For example, in block 102, the computing device divides the distorted image into two first image regions along a vertical direction. Two corrected first image regions are obtained and stitched to obtain a corrected image of the distorted image.

In the image correction method, a distorted image and a standard image corresponding to the distorted image are obtained. The distorted image is divided into first image regions and the standard image is divided into second image regions. For each first image region and corresponding second image region, first points are selected from the first image region, and second points are selected from the corresponding second image region. A relationship between the first image region and the second image region is determined according to the first points and the second points. The first image region is corrected according to the relationship between the first image region and the second image region. Corrected first image regions are stitched to obtain a corrected image of the distorted image. The image correction method improves the accuracy of image correction.

Embodiment 2

Figure 2:
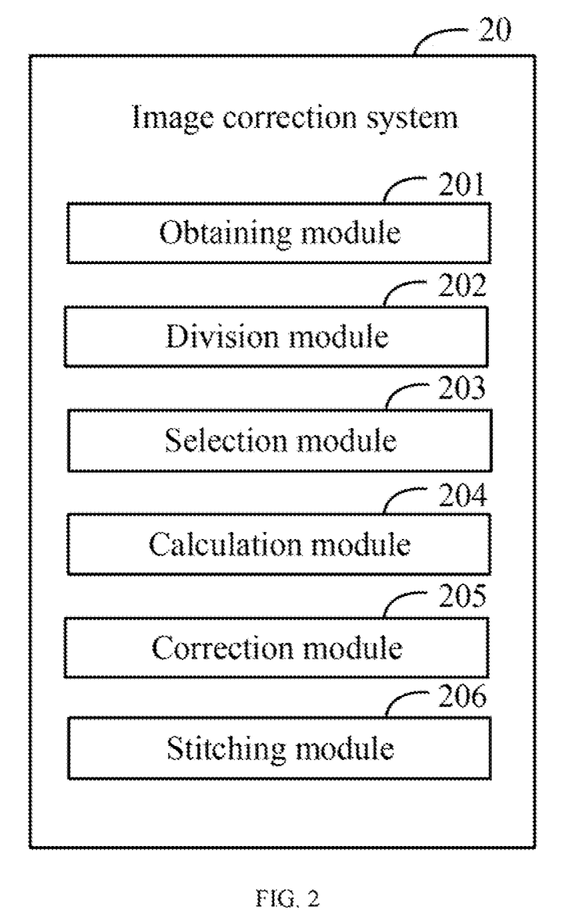
FIG. 2 is a block diagram of an image correction system provided in one embodiment of the present disclosure.

FIG. 2 is a block diagram of an image correction system provided in one embodiment of the present disclosure. The image correction system 20 is applied to a computing device. The image correction system is used for correcting images.

As shown in FIG. 2, the image correction system 20 may include an obtaining module 201, a division module 202, a selection module 203, a calculation module 204, a correction module 205, and a stitching module 206.

The obtaining module 201 is configured to obtain a distorted image and a standard image corresponding to the distorted image.

The distorted image is an image to be corrected. The standard image is a faultless image. Same objects are included in the distorted image and the standard image.

The distorted image can be captured by an image capturing device, or be obtained from an image database.

The division module 202 is configured to divide the distorted image into a plurality of image regions (hereinafter referred to as "first image regions"), and divide the standard image into a plurality of image regions (hereinafter referred to as "second image regions"). A number of the first image regions is same as the second image regions, and each first image region corresponds to a second image region.

The computing device may use a same method to divide the distorted image and the standard image.

For example, the computing device may divide the distorted image into two first image regions along a vertical direction, and divide the standard image into two second image regions along the vertical direction.

The selection module 203 selects a plurality of points (hereinafter referred to as "first points") from a first image region, and select a plurality of points (hereinafter referred to as "second points") from the corresponding second image region.

For example, the first image region includes a table, and the computing device selects four corners of the table in the first image region as the first points. The second image region also includes the table, the computing device selects four corners of the table in the second image region as the second points.

The calculation module 204 is configured to determine a relationship between the first image region and the second image region according to the first points and the second points.

In one embodiment, a method of determining a relationship between the first image region and the second image region according to the first points and the second points may include: calculating a transformation matrix from the first image region to the second image region according to the first points and the second points; and/or calculating a ratio relationship between the first image region and the second image region according to the first points and the second points.

In one embodiment, the first points and the second points are denoted as two-dimensional coordinates, and a method of calculating a transformation matrix from the first image region to the second image region according to the first points and the second points may include: determining three-dimensional coordinates of the first points according to two-dimensional coordinates of the first points and the transformation matrix; constructing equation sets according to the three-dimensional coordinates of the first points and two-dimensional coordinates of the second points; and calculating the transformation matrix according to the equation sets.

For example, two-dimensional coordinates of a first point are $(x_1, y_1)$, two-dimensional coordinates of a second point corresponding to the first coordinate point are $(x_2, y_2)$, a transformation matrix from the first image region to the second image region is $$\begin{bmatrix} a_{11} & a_{12} & a_{13} \\ a_{21} & a_{22} & a_{23} \\ a_{31} & a_{32} & a_{33} \end{bmatrix},$$

and $a_{11}$ to $a_{33}$ are transformation parameters of the transformation matrix.

Three-dimensional coordinates of the first point can be:

$$\begin{bmatrix} x \\ y \\ z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} x_1 \\ y_1 \\ 1 \end{bmatrix}.$$

$(x,y,z)$ are the three-dimensional coordinates of the first point corresponding to the two-dimensional coordinates $(x_1, y_1)$ of the first point, where $x=a_{11}x_1+a_{12}y_1+a_{13}$, $y=a_{21}x_1+a_{22}y_1+a_{23}$, and $z=a_{31}x_1+a_{32}y_1+a_{33}$.

An equation set can be constructed according to the three-dimensional coordinates $(x,y,z)$ of the first point and the two-dimensional coordinates $(x_2, y_2)$ of the second point:

$$\begin{cases} x_2 = \dfrac{x}{z} = \dfrac{a_{11}+x_1+a_{12}y_1+a_{13}}{a_{31}+x_1+a_{32}y_1+a_{33}} \\ y_2 = \dfrac{y}{z} = \dfrac{a_{21}+x_1+a_{22}y_1+a_{23}}{a_{31}+x_1+a_{32}y_1+a_{33}} \end{cases}.$$

For each first point and corresponding second point, an equation set is constructed. For example, four first points are selected from the first image region, and four corresponding second points are selected from the corresponding second image region. Accordingly, four equation sets are constructed for the four first points and the four corresponding second points.

The transformation parameters $a_{11}$ to $a_{33}$ are calculated according to the equation sets.

In one embodiment, a method of calculating a ratio relationship between the first image region and the second image region according to the first points and the second points may include: determining an x-axis and a y-axis of the first image region; determining first boundary points of the first image region according to the first points, and determining second boundary points of the second image region according to the second points; calculating a first distance between each of the first boundary points and the x-axis and a second distance between each of the first boundary points and the y-axis; calculating a third distance between each of the second boundary points and the x-axis and a fourth distance between each of the second boundary points and the y-axis; calculating a first ratio of the first distance to the third distance; and calculating a second ratio of the second distance to the fourth distance.

The correction module 205 is configured to correct the first image region according to the relationship between the first image region and the second image region.

In one embodiment, a method of correcting the first image region according to the relationship between the first image region and the second image region may include: calculating new two-dimensional coordinates of each point in the first image region according to the transformation matrix, and correcting a pixel value of each point in the first image region according to the new two-dimensional coordinates of each point in the first image; or calculating a new x-coordinate and a new y-coordinate of each point in the first image region according to the ratio relationship, and correcting a pixel value of each point in the first image region according to the new x-coordinate and the new y-coordinate of each point in the first image region.

In one embodiment, a method of calculating new two-dimensional coordinates of each point in the first image region according to the transformation matrix may include: converting original two-dimensional coordinates of each point in the first image region into three-dimensional coordinates according to the transformation matrix; and reducing a dimensionality of the three-dimensional coordinates to obtain the new two-dimensional coordinates.

In one embodiment, a method of calculating a new y-coordinate of each point in the first image region according to the ratio relationship may include: determining a first boundary point corresponding to each point in the first image region; determining a target ratio of the first boundary point according to the ratio relationship; acquiring a fifth distance between each point in the first image region and the x-axis of the first image region, and acquiring a sixth distance between the first boundary point and the x-axis; if the fifth distance is less than or equal to the sixth distance, calculating a product of a reciprocal of the target ratio and a y-coordinate of each point in the first image region to obtain the y target coordinate of each point in the first image region; if the fifth distance is greater than the sixth distance, obtaining a y-coordinate of a second boundary point corresponding to each point in the first image region, a y-coordinate of the first boundary point corresponding to each point in the first image region, y-coordinates of the first boundary points of the first image region, and y-coordinates of the second boundary points of the second image region, calculating the new y-coordinate according to the y-coordinate of a second boundary point corresponding to each point in the first image region, the y-coordinate of the first boundary point corresponding to each point in the first image region, the y-coordinates of the first boundary points of the first image region, and the y-coordinates of the second boundary points of the second image region.

In one embodiment, a formula of calculating the new y-coordinate according to the y-coordinate of a second boundary point corresponding to each point in the first image region, the y-coordinate of the first boundary point corresponding to each point in the first image region, the y-coordinates of the first boundary points of the first image region, and the y-coordinates of the second boundary points of the second image region are:

$$\frac{O_y - E_y}{P_y - F_y} = \frac{W_y - E_y}{V_y - F_y}.$$

In the formula, $O_y$ represents the new y-coordinate of each point in the first image region, $E_y$ represents the y-coordinate of the second boundary point corresponding to each point in the first image region, $P_y$ represents the y-coordinate of each point in the first image region, and $F_y$ represents the y-coordinate of the first boundary point corresponding to each point in the first image region. $V_y$ represents the y-coordinates of the first boundary points of the first image region, and $W_y$ represents the y-coordinates of the second boundary points of the second image region.

In another embodiment, if the fifth distance is less than or equal to the sixth distance, the image correction method further may include: calculating a square of the reciprocal of the target ratio, and calculating a product of the square and the y-coordinate of the pixel point to obtain the y target coordinate of each point in the first image region.

The stitching module 206 is configured to stitch corrected first image regions to obtain a corrected image of the distorted image.

For example, in block 102, the computing device divides the distorted image into two first image regions along a vertical direction. Two corrected first image regions are obtained and stitched to obtain a corrected image of the distorted image.

The image correction system 20 obtains a distorted image and a standard image corresponding to the distorted image. The image correction system 20 divides the distorted image into first image regions and divides the standard image into second image regions. For each first image region and corresponding second image region, the image correction system 20 selects first points from the first image region, and selects second points from the corresponding second image region. A relationship between the first image region and the second image region is determined according to the first points and the second points. The first image region is corrected according to the relationship between the first image region and the second image region. Corrected first image regions are stitched to obtain a corrected image of the distorted image. The image correction system 20 improves the accuracy of image correction.

Embodiment 3

The embodiment provides a storage medium on which a computer program is stored. When the computer program is executed by a processor, the blocks in the embodiment of the image correction method may be implemented, such as 101 to 106 in FIG. 1.

In block 101, the computing device obtains a distorted image and a standard image corresponding to the distorted image.

In block 102, the computing device divides the distorted image into first image regions, and divides the standard image into second image regions.

In block 103, for each first image region and a corresponding second image region, the computing device selects first points from the first image region, and selects second points from the corresponding second image region.

In block 104, the computing device determines a relationship between the first image region and the second image region according to the first points and the second points.

In block 105, the computing device corrects the first image region according to the relationship between the first image region and the second image region.

In block 106, the computing device stitches corrected first image regions to obtain a corrected image of the distorted image.

Alternatively, when the computer program is executed by the processor, the functions of the image correction system may be implemented, such as the modules 201 to 206 in FIG. 2.

The obtaining module 201 is configured to obtain a distorted image and a standard image corresponding to the distorted image.

The division module 202 is configured to divide the distorted image into first image regions, and divide the standard image into second image regions.

The selection module 203 is configured to for each first image region and a corresponding second image region, select first points from the first image region, and select second points from the corresponding second image region.

The calculation module 204 is configured to determine a relationship between the first image region and the second image region according to the first points and the second points.

The correction module 205 is configured to correct the first image region according to the relationship between the first image region and the second image region.

The stitching module 206 is configured to stitch corrected first image regions to obtain a corrected image of the distorted image.

Embodiment 4

Figure 3:
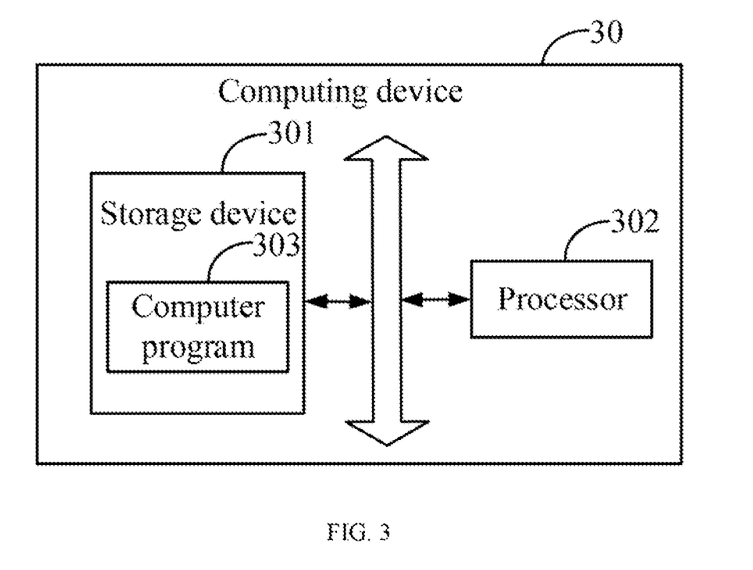
FIG. 3 is a block diagram of a computing device implementing the image correction method in one embodiment of the present disclosure.

FIG. 3 is a block diagram of a computing device implementing the image correction method in one embodiment of the present disclosure. The computing device 30 may include a storage device 301, a processor 302, and a computer program 303, such as an image correction program stored in the storage device 301 and executable by the processor 302. The processor 302 may execute the computer program 303 to implement the blocks in the image correction method described above, such as the blocks 101 to 106 in FIG. 1. Alternatively, the processor 302 may execute the computer program 303 to implement the functions of the image correction system described above, such as the modules 201 to 206 in FIG. 2.

In block 101, the computing device obtains a distorted image and a standard image corresponding to the distorted image.

In block 102, the computing device divides the distorted image into first image regions, and divides the standard image into second image regions.

In block 103, for each first image region and a corresponding second image region, the computing device selects first points from the first image region, and selects second points from the corresponding second image region.

In block 104, the computing device determines a relationship between the first image region and the second image region according to the first points and the second points.

In block 105, the computing device corrects the first image region according to the relationship between the first image region and the second image region.

In block 106, the computing device stitches corrected first image regions to obtain a corrected image of the distorted image.

Alternatively, the processor 302 may execute the computer program 303 to implement the functions of the image correction system described above, such as the modules 201-206 in FIG. 2.

The obtaining module 201 is configured to obtain a distorted image and a standard image corresponding to the distorted image.

The division module 202 is configured to divide the distorted image into first image regions, and divide the standard image into second image regions.

The selection module 203 is configured to for each first image region and a corresponding second image region, select first points from the first image region, and select second points from the corresponding second image region.

The calculation module 204 is configured to determine a relationship between the first image region and the second image region according to the first points and the second points.

The correction module 205 is configured to correct the first image region according to the relationship between the first image region and the second image region.

The stitching module 206 is configured to stitch corrected first image regions to obtain a corrected image of the distorted image.

In an exemplary embodiment, the computer program 303 may be divided into one or more modules, and the one or more modules are stored in the storage device 301 and executed by the processor 302 to complete the image correction method of the present disclosure. The one or more modules can be a series of computer-readable instruction segments capable of performing specific functions, and the instruction segments are used to describe execution processes of the computer program 303 in the computing device 30. For example, the computer program 303 can be divided into the obtaining module 201, the division module 202, the selection module 203, the calculation module 204, the correction module 205, and the stitching module 206 in FIG. 2.

The computing device 30 may be a desktop computer, a notebook, a palmtop computer, or a cloud server. Those skilled in the art will understand that the block diagram is only an example of the computing device 30, and does not constitute a limitation on the computing device 30. Other examples of the computing device 30 may include more or fewer components than shown in FIG. 3, or combine some components or have different components. For example, the computing device 30 may further include an input/output device, a network access device, a bus, and the like.

The processor 302 may be a central processing unit (CPU), other general-purpose processors, a digital signal processors (DSP), an application specific integrated circuit (ASIC), a field-programmable gate array (FPGA) or other programmable logic devices, discrete gates or transistor logic devices, discrete hardware components, etc. The general-purpose processor can be a microprocessor or the processor 302 can also be any conventional processor, etc. The processor 302 is a control center of the computing device 30, which uses various interfaces and lines to connect various parts of the entire computing device 3.

The memory 301 may be used to store the computer program 303, and the processor 302 implements the computing device by running or executing the computer program or module stored in the memory 301 and calling data stored in the memory 301 30 various functions. The memory 301 may mainly include a storage program area and a storage data area. The storage program area may store an operating system, an application program required by at least one function (such as a sound playback function, an image playback function, etc.), etc.; the storage data area may include data and the like created according to the use of the computing device 30. In addition, the memory 301 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 302 may be a central processing unit (CPU) or other general-purpose processor, a digital signal processor (DSP), an application specific integrated circuit (ASIC), a field-programmable gate array (FPGA) or other programmable logic device, a discrete gate, or a transistor logic device, or a discrete hardware component, etc. The processor 302 may be a microprocessor or any conventional processor. The processor 302 may be a control center of the computing device 30, and connect various parts of the entire computing device 30 by using various interfaces and lines.

The storage device 301 may be configured to store the computer program 303 and/or modules. The processor 302 may run or execute the computer-readable instructions and/or modules stored in the storage device 301, and may invoke data stored in the storage device 301 to implement various functions of the computing device 30. The storage device 301 may include a program storage area and a data storage area. The program storage area may store an operating system, an application program required for at least one function (such as a sound playback function, an image playback function), etc. The data storage area may store data created for using the computing device 30. In addition, the storage device 301 may include a random access memory, and may also include a non-transitory storage medium, such as a hard disk, an internal memory, a plug-in hard disk, a smart media card (SMC), and a secure digital (SD) card, a flash card, at least one disk storage device, a flash memory, or other non-transitory solid-state storage device.

When the modules integrated in the computing device 30 are implemented in the form of software functional units and used as independent units, they can be stored in a non-transitory readable storage medium. Based on this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the steps of the foregoing method embodiments. The computer-readable instructions include computer-readable instruction codes, and the computer-readable instruction codes can be source code, object code, an executable file, or in some intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

In several embodiments provided in the preset application, it should be understood that the disclosed computing device and method may be implemented in other ways. For example, the embodiment of the computing device described above is merely illustrative. For example, the units are only obtained by logical function divisions, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but do not signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

What is claimed is:

1. A image correction method, comprising:
obtaining a distorted image and a standard image corresponding to the distorted image;

dividing the distorted image into first image regions, and dividing the standard image into second image regions;
for each first image region and a corresponding second image region, selecting first points from the first image region, and selecting second points from the corresponding second image region;
determining a relationship between the first image region and the second image region according to coordinates of the first points and coordinates of the second points;
correcting each point in the first image region according to the relationship between the first image region and the second image region; and
stitching corrected first image regions to obtain a corrected image of the distorted image;
wherein determining the relationship between the first image region and the second image region according to the coordinates of the first points and the coordinates of the second points comprises:
calculating a ratio relationship between the first image region and the second image region according to the coordinates of the first points and the coordinates of the second points;
wherein calculating the ratio relationship between the first image region and the second image region according to the coordinates of the first points and the coordinates of the second points comprises:
determining an x-axis and a y-axis of the first image region;
determining first boundary points of the first image region according to the coordinates of the first points, and determining second boundary points of the second image region according to the coordinates of the second points;
calculating a first distance between each of the first boundary points and the x-axis and a second distance between each of the first boundary points and the y-axis;
calculating a third distance between each of the second boundary points and the x-axis and a fourth distance between each of the second boundary points and the y-axis;
calculating a first ratio of the first distance to the third distance; and
calculating a second ratio of the second distance to the fourth distance.

2. The image correction method of claim 1, wherein correcting each point in the first image region according to the relationship between the first image region and the second image region comprises:
calculating a new x-coordinate and a new y-coordinate of each point in the first image region according to the ratio relationship, and correcting a pixel value of each point in the first image region according to the new x-coordinate and the new y-coordinate of each point in the first image region.

3. The image correction method of claim 2, wherein calculating the new y-coordinate of each point in the first image region according to the ratio relationship comprises:
determining a first boundary point corresponding to each point in the first image region;
determining a target ratio of the first boundary point according to the ratio relationship;
acquiring a fifth distance between each point in the first image region and the x-axis of the first image region, and acquiring a sixth distance between the first boundary point and the x-axis;
if the fifth distance is less than or equal to the sixth distance, calculating a product of a reciprocal of the target ratio and a y-coordinate of each point in the first image region to obtain the new y-coordinate of each point in the first image region; and
if the fifth distance is greater than the sixth distance, obtaining a y-coordinate of a second boundary point corresponding to each point in the first image region, a y-coordinate of the first boundary point corresponding to each point in the first image region, y-coordinates of the first boundary points of the first image region, and y-coordinates of the second boundary points of the second image region, and calculating the new y-coordinate of each point in the first image region according to the y-coordinate of a second boundary point corresponding to each point in the first image region, the y-coordinate of the first boundary point corresponding to each point in the first image region, the y-coordinates of the first boundary points of the first image region, and the y-coordinates of the second boundary points of the second image region.

4. A computing device comprising:
at least one processor; and
a storage device storing computer-readable instructions, which when executed by the at least one processor, cause the at least one processor to:
obtain a distorted image and a standard image corresponding to the distorted image;
divide the distorted image into first image regions, and divide the standard image into second image regions;
for each first image region and a corresponding second image region, select first points from the first image region, and select second points from the corresponding second image region;
determine a relationship between the first image region and the second image region according to coordinates of the first points and coordinates of the second points;
correct each point in the first image region according to the relationship between the first image region and the second image region; and
stitch corrected first image regions to obtain a corrected image of the distorted image;
wherein the at least one processor is further caused to:
calculate a ratio relationship between the first image region and the second image region according to the coordinates of the first points and the coordinates of the second points;
wherein the at least one processor is further caused to:
determine an x-axis and a y-axis of the first image region;
determine first boundary points of the first image region according to the coordinates of the first points, and determine second boundary points of the second image region according to the coordinates of the second points;
calculate a first distance between each of the first boundary points and the x-axis and a second distance between each of the first boundary points and the y-axis;
calculate a third distance between each of the second boundary points and the x-axis and a fourth distance between each of the second boundary points and the y-axis;
calculate a first ratio of the first distance to the third distance; and
calculate a second ratio of the second distance to the fourth distance.

5. The computing device of claim 4, wherein the at least one processor is further caused to:
calculate a new x-coordinate and a new y-coordinate of each point in the first image region according to the ratio relationship, and correct a pixel value of each point in the first image region according to the new x-coordinate and the new y-coordinate of each point in the first image region.

6. The computing device of claim 5, wherein the at least one processor is further caused to:
determine a first boundary point corresponding to each point in the first image region;
determine a target ratio of the first boundary point according to the ratio relationship;
acquire a fifth distance between each point in the first image region and the x-axis of the first image region, and acquire a sixth distance between the first boundary point and the x-axis;
if the fifth distance is less than or equal to the sixth distance, calculate a product of a reciprocal of the target ratio and a y-coordinate of each point in the first image region to obtain the new y-coordinate of each point in the first image region; and
if the fifth distance is greater than the sixth distance, obtain a y-coordinate of a second boundary point corresponding to each point in the first image region, a y-coordinate of the first boundary point corresponding to each point in the first image region, y-coordinates of the first boundary points of the first image region, and y-coordinates of the second boundary points of the second image region, and calculate the new y-coordinate of each point in the first image region according to the y-coordinate of a second boundary point corresponding to each point in the first image region, the y-coordinate of the first boundary point corresponding to each point in the first image region, the y-coordinates of the first boundary points of the first image region, and the y-coordinates of the second boundary points of the second image region.

7. A non-transitory storage medium having stored thereon computer-readable instructions that, when the computer-readable instructions are executed by a processor to implement an image correction method comprising:
obtaining a distorted image and a standard image corresponding to the distorted image;
dividing the distorted image into first image regions, and dividing the standard image into second image regions;
for each first image region and a corresponding second image region, selecting first points from the first image region, and selecting second points from the corresponding second image region;
determining a relationship between the first image region and the second image region according to coordinates of the first points and coordinates of the second points;
correcting each point in the first image region according to the relationship between the first image region and the second image region; and
stitching corrected first image regions to obtain a corrected image of the distorted image;
wherein determining the relationship between the first image region and the second image region according to the coordinates of the first points and the coordinates of the second points comprises:
calculating a ratio relationship between the first image region and the second image region according to the coordinates of the first points and the coordinates of the second points;
wherein calculating the ratio relationship between the first image region and the second image region according to the coordinates of the first points and the coordinates of the second points comprises:
determining an x-axis and a y-axis of the first image region;
determining first boundary points of the first image region according to the coordinates of the first points, and determining second boundary points of the second image region according to the coordinates of the second points;
calculating a first distance between each of the first boundary points and the x-axis and a second distance between each of the first boundary points and the y-axis;
calculating a third distance between each of the second boundary points and the x-axis and a fourth distance between each of the second boundary points and the y-axis;
calculating a first ratio of the first distance to the third distance; and
calculating a second ratio of the second distance to the fourth distance.

8. The non-transitory storage medium of claim 7, wherein correcting each point in the first image region according to the relationship between the first image region and the second image region comprises:
calculating a new x-coordinate and a new y-coordinate of each point in the first image region according to the ratio relationship, and correcting a pixel value of each point in the first image region according to the new x-coordinate and the new y-coordinate of each point in the first image region.

9. The non-transitory storage medium of claim 8, wherein calculating the new y-coordinate of each point in the first image region according to the ratio relationship comprises:
determining a first boundary point corresponding to each point in the first image region;
determining a target ratio of the first boundary point according to the ratio relationship;
acquiring a fifth distance between each point in the first image region and the x-axis of the first image region, and acquiring a sixth distance between the first boundary point and the x-axis;
if the fifth distance is less than or equal to the sixth distance, calculating a product of a reciprocal of the target ratio and a y-coordinate of each point in the first image region to obtain the new y-coordinate of each point in the first image region; and
if the fifth distance is greater than the sixth distance, obtaining a y-coordinate of a second boundary point corresponding to each point in the first image region, a y-coordinate of the first boundary point corresponding to each point in the first image region, y-coordinates of the first boundary points of the first image region, and y-coordinates of the second boundary points of the second image region, and calculating the new y-coordinate of each point in the first image region according to the y-coordinate of a second boundary point corresponding to each point in the first image region, the y-coordinate of the first boundary point corresponding to each point in the first image region, the y-coordinates of the first boundary points of the first image region, and the y-coordinates of the second boundary points of the second image region.

\* \* \* \* \*